(12) United States Patent
Hwu

(10) Patent No.: US 7,783,101 B2
(45) Date of Patent: Aug. 24, 2010

(54) METHOD AND SYSTEM FOR DETERMINING DIMENSIONS OF A STRUCTURE HAVING A RE-ENTRANT PROFILE

(75) Inventor: Justin Jia-Jen Hwu, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 522 days.

(21) Appl. No.: 11/013,613

(22) Filed: Dec. 15, 2004

(65) Prior Publication Data
US 2006/0126915 A1 Jun. 15, 2006

(51) Int. Cl.
*G06K 9/00* (2006.01)

(52) U.S. Cl. ............ 382/145; 356/601; 356/635; 382/144; 702/155

(58) Field of Classification Search ............ 250/306, 250/307, 310, 311, 397, 492.3; 382/151, 382/144, 152, 145, 153; 356/601, 625, 635; 702/155, 166, 167, 170
See application file for complete search history.

(56) References Cited

U.S. PATENT DOCUMENTS

| | | | |
|---|---|---|---|
| 6,228,745 B1 * | 5/2001 | Wheeler et al. | 438/424 |
| 6,396,059 B1 * | 5/2002 | Singh et al. | 250/310 |
| 6,524,916 B1 * | 2/2003 | Scholer et al. | 438/270 |
| 6,559,446 B1 * | 5/2003 | Choo et al. | 250/310 |
| 6,566,655 B1 * | 5/2003 | Choo et al. | 250/310 |
| 6,650,424 B2 * | 11/2003 | Brill et al. | 356/601 |
| 6,794,299 B1 * | 9/2004 | Markle et al. | 438/710 |
| 6,924,085 B2 * | 8/2005 | Zaloom et al. | 430/302 |
| 7,143,005 B2 * | 11/2006 | Dahlen et al. | 702/168 |
| 2003/0092280 A1 * | 5/2003 | Lee et al. | 438/720 |
| 2005/0194534 A1 * | 9/2005 | Kneedler et al. | 250/307 |
| 2006/0126915 A1 * | 6/2006 | Hwu | 382/151 |

* cited by examiner

*Primary Examiner*—Gregory M Desire

(57) ABSTRACT

Methods and systems for determining dimensions of a structure that has a re-entrant profile are disclosed. A method includes imaging at least a portion of a top surface of the structure. Subsequently, a second portion of the structure is imaged from a plurality of perspectives. A third portion of the structure is also imaged from a plurality of perspectives. A dimension of a bottom portion of the structure is determined based on the imaging.

32 Claims, 8 Drawing Sheets

METHOD AND SYSTEM FOR DETERMINING DIMENSIONS OF A STRUCTURE HAVING A RE-ENTRANT PROFILE

TECHNICAL FIELD

Embodiments of the present invention pertain to a method and system for determining dimensions of a structure having a re-entrant profile.

BACKGROUND ART

In the fabrication of semiconductor or data storage devices, the attainment of high device densities enables the provision of semiconductor or data storage systems that have enhanced functional capacity. Miniaturization involves the scaling down of device dimensions on semiconductor or data storage wafers so that semiconductor or data storage wafers with high device densities can be attained. Scanning electron microscopes can be employed to measure the dimensions of the miniature structures that lie on a semiconductor or data storage wafer during the fabrication process.

High-resolution photolithographic processes allow high-resolution spacing of structures included on a semiconductor chip or data storage head. Moreover, photolithographic processes allow the transfer of patterns that delineate these structures from a source medium to a silicon wafer. Engineers use photolithography in the manufacture of microelectronic chips and thin film heads for magnetic data recording devices. As a part of the process, a light activated film called a photoresist is applied onto a silicon wafer. A mask representing a type of stencil is placed in the optical path of a lithographic system utilizing ultraviolet light or light with even higher resolution transferring the feature image on the mask to the film. Depending on the photoresist types, either the exposed or the non-disposed portion is dissolved during the development and the feature image is exposed. The wafers go through the following etch process and the pattern of circuit pathways are defined. Electronic board manufacturers also use a similar photolithographic process to print some computer circuit boards.

Conventional techniques for defining wafer structures, such as photolithography and etch, can result in structures that have a re-entrant profile. A feature that has a re-entrant profile can have sidewalls that taper inwardly at the bottom. Some conventional systems employ scanning electron microscopes that attempt to measure dimensions of structures that have such aforementioned re-entrant profiles.

A re-entrant profile can cause process complexities. For example, a phenomenon called shadowing can affect the proper execution of deposition processes. Shadowing prevents material from being properly deposited and can result in the formation of voids at the bottom surface of the structure that has the re-entrant profile.

The formation of voids can have serious consequences both to the fabrication process itself and to the devices that result from it. The process can be impaired as subsequent processing steps that rely on void free surfaces can be deleteriously affected. Moreover, the voids can result in device defects that impair the performance of the devices that result from the process.

FIG. 1 shows a conventional critical dimension-scanning electron microscope (CD-SEM) system 100 that is used to measure and/or image structures that have a re-entrant profile. System 100 includes a chamber 101 that houses a wafer 103. An electron beam 105 that is generated by components of system 100 may be directed from an electromagnetic or electrostatic lens 113 to the wafer 103 at different angles relative to the wafer 103. The electron beam is created from high voltage that is supplied from power supply 111 and is associated with beam generating system 109 that includes emission element 107. Structures 123 and 125 have a re-entrant profile and are scanned with electron beam 105 to obtain data that is used in an attempt to determine a dimension (e.g., height) of structures 123 and 125.

Many of the conventional methodologies that attempt to ascertain the critical dimensions of structures such as structures 123 and 125 that lie on wafers fail to adequately detect and measure the re-entrant profiles of the structures and spaces that lie thereon. One such conventional approach creates or identifies features on the wafer near the structure that is being measured as a means of generating information that is necessary to the dimension measurement process.

Another conventional approach measures the intensity of the light that is reflected from a surface of a structure on the wafer that is being measured as a means of determining the angle of the surface from which it is reflected. These conventional critical dimension measurement methodologies embody inefficient and often inaccurate measurement techniques that can require wasteful process changes and/or steps in order to execute.

SUMMARY OF THE INVENTION

Methods and systems for determining dimensions of a structure that has a re-entrant profile are disclosed. A method includes imaging at least a portion of a top surface of the structure. Subsequently, a second portion of the structure is imaged from a plurality of perspectives. A third portion of the structure is also imaged from a plurality of perspectives. A dimension of a bottom portion of the structure is determined based on the imaging.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Determining Dimensions of a Structure that Has a Re-Entrant Profile According to One Embodiment of the Present Embodiment FIGS. 2A-2E illustrate an imaging process that is employed to determine dimensions of a structure that has a re-entrant profile according to one embodiment of the invention. In exemplary embodiments, a bottom critical dimension (BCD) of the structure can be determined from information acquired through imaging (e.g. such as by scanning using a critical dimension scanning electron microscope (CD-SEM)). In one embodiment, after a top surface of the structure is imaged, each of the sidewalls of the structure is imaged from a plurality of perspectives. A bottom critical dimension of the structure can be determined from geometric information that is derived from the imaging operations. It should be appreciated that in exemplary embodiments, the bottom critical dimension can be determined without requiring a reference feature which does not represent the measurement interest location itself.

Figure 1:
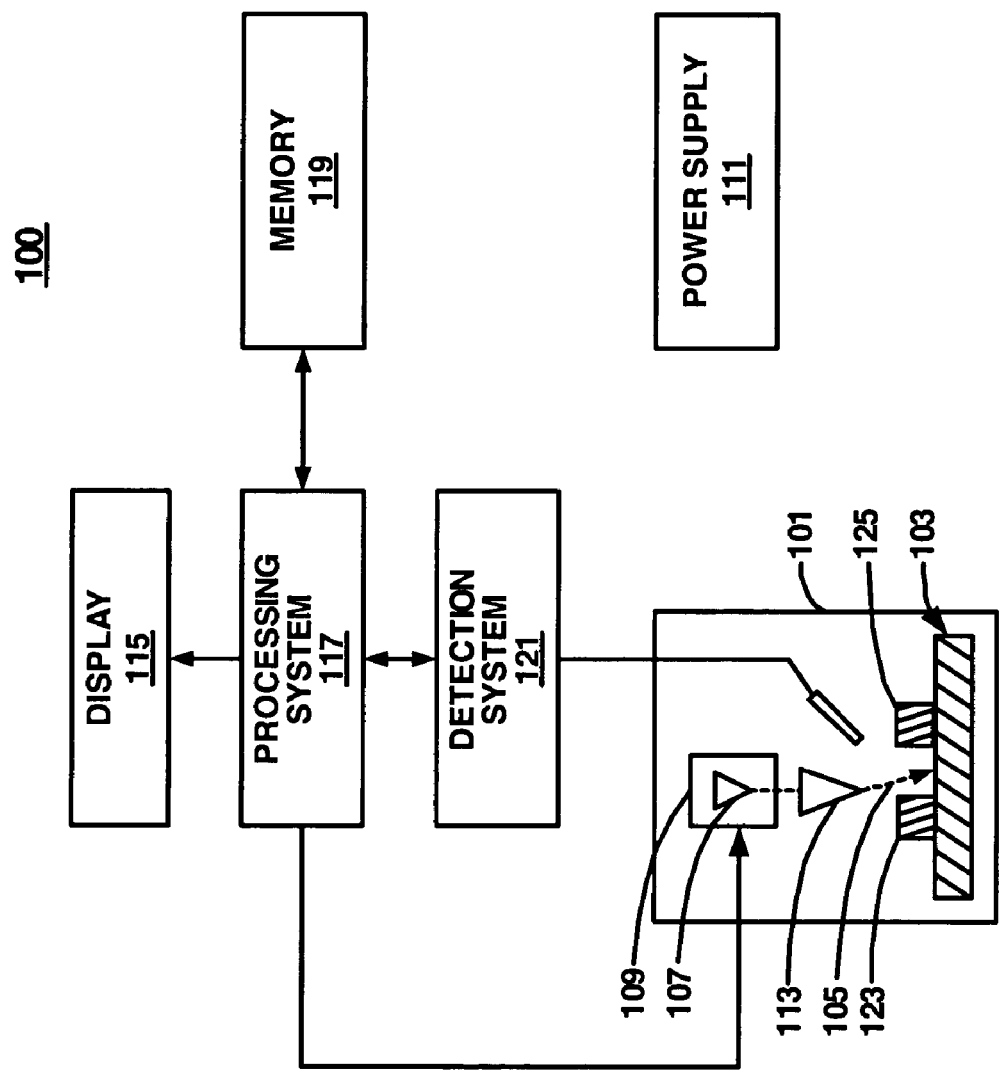
FIG. 1 shows a conventional critical dimension scanning electron microscope (CD-SEM) system.
Figure 2A:
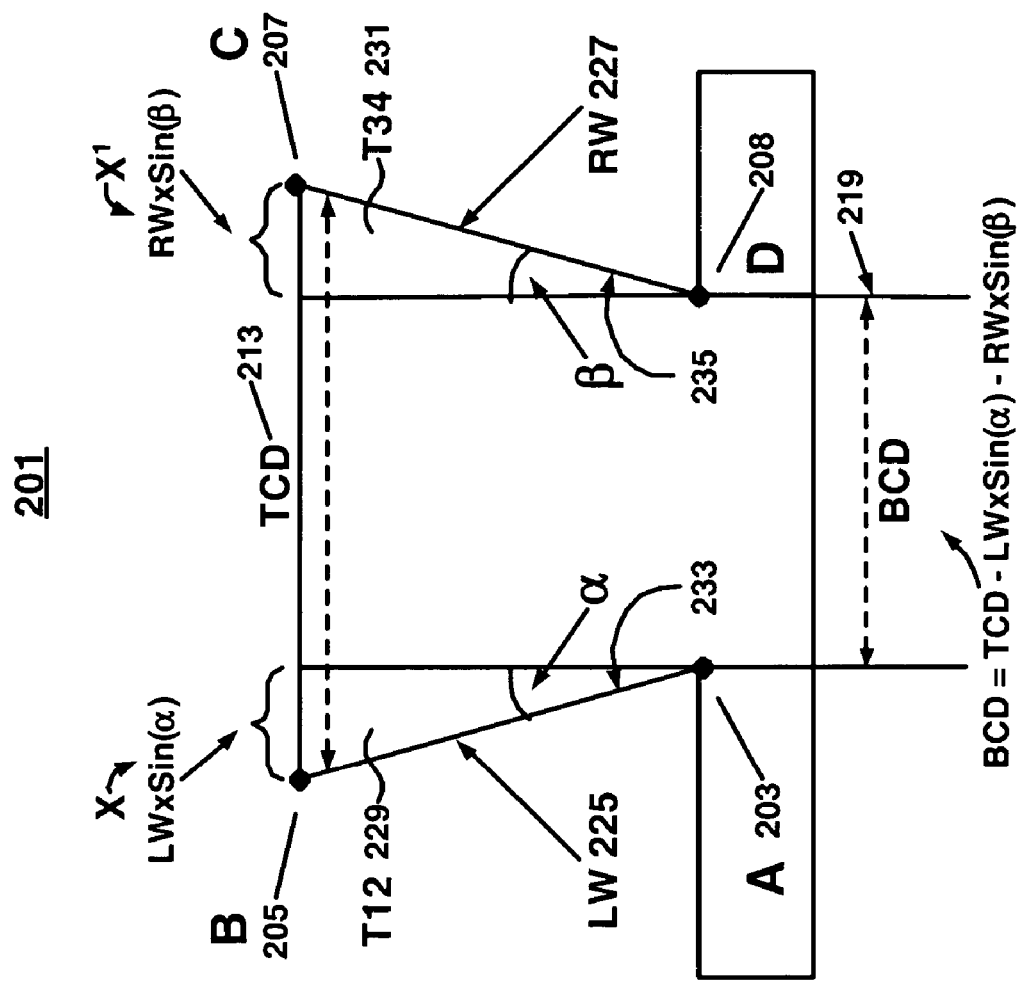
FIG. 2A illustrates an imaging process that is employed to determine dimensions of a structure that has a re-entrant profile according to one embodiment of the invention.

FIG. 2A shows a structure 201 that has a re-entrant profile. In one embodiment, geometric relationships that exist between the surfaces of structure 201 can facilitate the ascertainment of its various dimensions. In one embodiment, the bottom critical dimension (BCD) 219 and the re-entrant angles 233 and 235 of structure 201 can be determined based on these geometric relationships. Referring to FIG. 2A, structure 201 has a top critical dimension (TCD) 213, a bottom critical dimension (BCD) 219, a left sidewall LW 225 and a right sidewall RW 227. In one embodiment, using image data, a pair of right triangles T12 229 and T34 231 can be imputed between the surfaces that correspond to the TCD 213 and the BCD 219 of structure 201. These triangles enable the computing of the BCD 219 and the re-entrant angles 233 and 235 of structure 201.

The imputed right triangles T12 229 and T34 231 include angles, $\alpha$ and $\beta$, hypotenuses LW 225 and RW 227, and sides X and X' (see FIG. 2A). In one embodiment, as shown in FIG. 2A, the length of the surface that corresponds to the BCD 219 of structure 201 can be determined by subtracting the length of the sides X and X' of triangles T12 229 and T34 231 that are coincident with the surface that corresponds to the TCD 213 from the total length of the TCD 213. In one embodiment, the lengths of the sides of triangles T12 229 and T34 231 that are coincident with surface TCD 213 (see FIG. 2A) are given by the equations:

$$T12\ side\ X = LW \times \sin(\alpha) \quad (1)$$

$$T34\ side\ X' = RW \times \sin(\beta) \quad (2)$$

From these equations the length of the BCD 219 can be easily determined from the following equation:

$$BCD = TCD - LW \times \sin(\alpha) - RW \times \sin(\beta) \quad (3)$$

In one embodiment, the equation (3) element TCD can be determined from an initial top down imaging, i.e., with the imaging perspective parallel to the line perpendicular to the TCD surface of structure 201. Moreover, the equation (3) elements LW, RW, $\alpha$, and $\beta$ can be determined from subsequent imaging operations as are described with reference to FIGS. 2B-2E below.

Also, shown in FIG. 2A are reference edges A 203, B 205, C 207 and D 208. In one embodiment, these reference edges are used as a means of identifying imaging system, e.g., critical dimension scanning electron microscope (CD-SEM), etc., scanning initiation and termination points that may be employed during an exemplary scanning process.

In one embodiment, the tilt angles employed to image the left and right sidewalls of structure 201 should be greater than $\alpha$ and $\beta$ respectively. Such angles allow the imaging of the reference edges and other features involved in imaging processes described herein.

Imaging a Structure that Has a Re-Entrant Profile to Generate Geometric Equations According to One Embodiment of the Present Invention In one embodiment, the BCD 219 of structure 201 can be determined based on image data that can be obtained through the imaging of various surfaces of structure 201. More specifically, surfaces TCD 213, LW 225 and RW 227 of structure 201 can be imaged to obtain the image data that is needed to determine the BCD 219 of structure 201. In one embodiment, initially, the structure surface associated with the TCD 213 can be imaged. Subsequently structure surfaces LW 225 and RW 227 can each be imaged from a plurality of perspectives (e.g., tilt angles) to obtain the image data that is needed to determine the BCD 219 of structure 201.

Figure 2B:
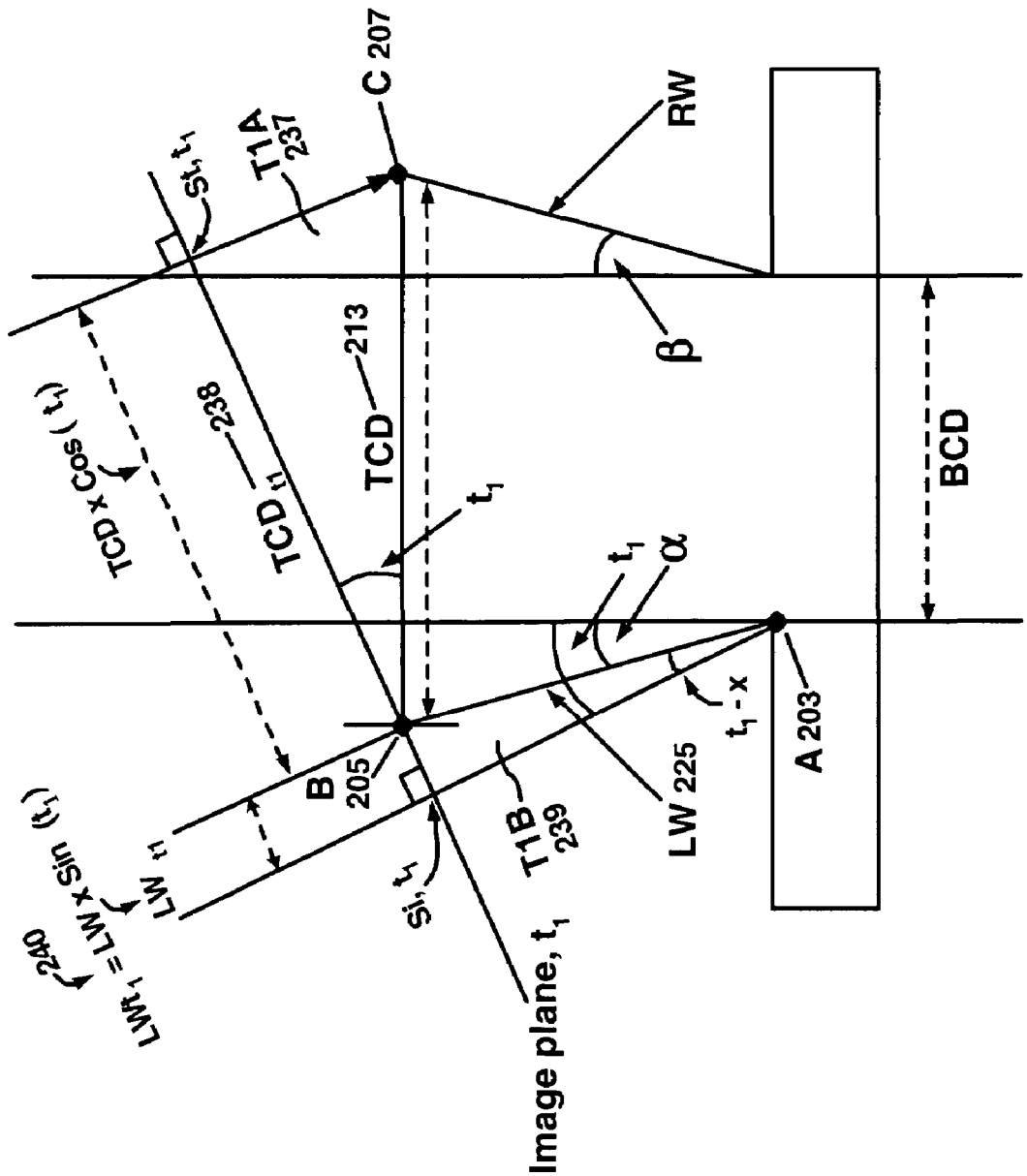
FIG. 2B illustrates an imaging process that is employed to determine dimensions of a structure that has a re-entrant profile according to one embodiment of the invention.

FIG. 2B illustrates the imaging of portions of structure 201 from a first perspective (e.g., at imaging angle t1 with respect to an imaginary line perpendicular to the TCD surface) by an imaging system (such as a CD-SEM). In the FIG. 2B embodiment, scanning is initiated at a point left of Si, t1 (see FIG. 2B) in the image plane that is coincident with a line that is perpendicular to the image plane and that intersects reference edge A 203. In this embodiment, scanning is terminated at a point right of St, t1 in the image plane that is coincident with a line that is perpendicular to the image plane and that intersects reference edge C 207 (see FIG. 2B).

FIG. 2B shows, in addition to the illustrations shown in FIG. 2A, right triangles T1A 237 and T1B 239 and right triangle dimensions TCDt1 238 and LWt1 240. It should be appreciated that TCDt1 238 and LWt1 240 are the projections of TCD 213 and LW 225 respectively into the image plane of the imaging system (not shown) at angle t1. Using the projected image data that is acquired through the aforementioned imaging operations, a pair of right triangles T1A 237 and T1B 239 can be imputed with respect to surfaces TCD 213 and LW 225 of structure 201, as is illustrated in FIG. 2B. In one embodiment, from the aforementioned image data that is obtained by imaging structure 201 from a first tilt angle t1 the following first pair of equations can be derived:

$$TCDt1=TCD\times Cos(t1) \quad (4)$$

$$LWt1=LW\times Sin(t1-\alpha) \quad (5)$$

Figure 2C:
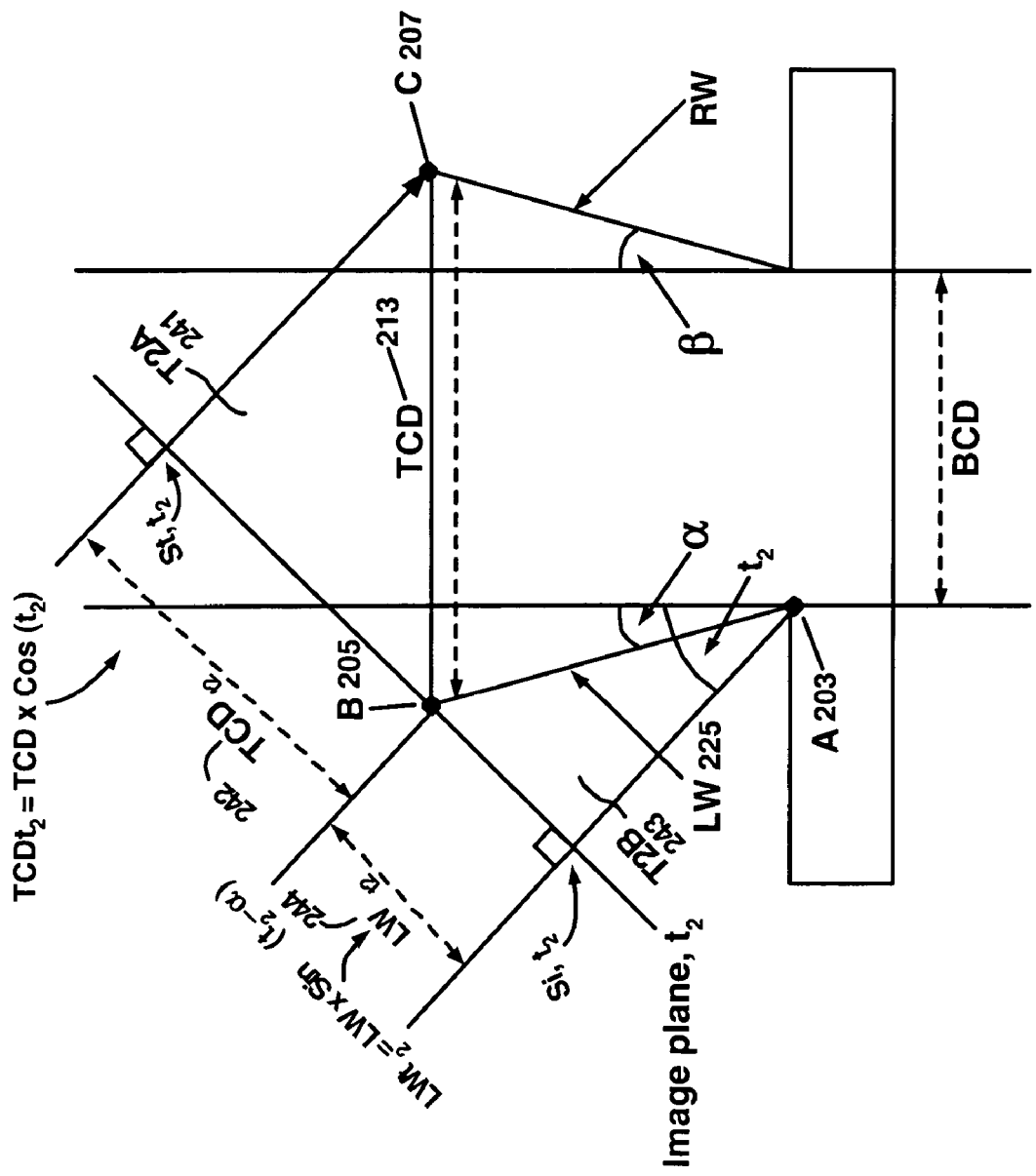
FIG. 2C illustrates an imaging process that is employed to determine dimensions of a structure that has a re-entrant profile according to one embodiment of the invention.

It should be appreciated that TCD and t1 are known quantities and thus equation (4) can be solved directly. By contrast equation (5) contains unknown variables LW and $\alpha$. However, by imaging the same side of structure 201 from a second perspective a second pair of equations can be generated that includes an equation that has the same unknown variables as does equation (5). From the generated equations, the unknowns LW and $\alpha$ can be determined in a straightforward manner through substitution. FIG. 2C illustrates how the second pair of equations can be generated according to one embodiment.

FIG. 2C illustrates the imaging of portions of structure 201 from a second perspective (e.g., at imaging angle t2). In the FIG. 2C embodiment, scanning is initiated at a point left of Si, t2 in the image plane that is coincident with a normal line that is perpendicular to the image plane and that intersects reference edge A 203. In this embodiment, scanning is terminated at a point right of St, t2 in the image plane that is coincident with a normal line that is perpendicular to the image plane and that intersects reference edge C 207.

FIG. 2C shows, in addition to the illustrations shown in FIGS. 2A and 2B, right triangles T2A 241 and T2B 243 and right triangle dimensions TCDt2 242 and LWt2 244. It should be appreciated that TCDt2 242 and LWt1 244 are the projections of TCD 213 and LW 225 respectively into image plane of the imaging system (not shown) at angle t2. Using this projected image data that is acquired through the aforementioned imaging operations, a pair of right triangles T2A 241 and T2B 243 can be imputed with respect to surfaces TCD 213 and LW 225 of structure 201 as is illustrated in FIG. 2C. Moreover, in one embodiment, from the image data that is obtained by imaging what is shown in FIG. 2C as the left side of structure 201 at a second tilt angle t2, the following second pair of equations can be derived:

$$TCDt2=TCD\times Cos(t2) \quad (6)$$

$$LWt2=LW\times Sin(t2-\alpha) \quad (7)$$

From tilt angle t2 equations (6) and (7) are generated. Moreover, equation (7) has the same two unknown variables LW and $\alpha$ as does equation 5. Thus, using equations (6) and (7), the unknowns LW and $\alpha$ can be determined in a straightforward manner through substitution.

Consequently, two of the four unknowns, namely LW and $\alpha$, involved in determining BCD 219 (such as from equation 3 discussed above) can be determined through the imaging a first side of structure 201. The remaining two unknowns in equation (3), namely RW and $\beta$, can be determined by imaging the opposite side of structure 201 and generating additional equations as is discussed with reference to FIGS. 2D and 2E below.

Figure 2D:
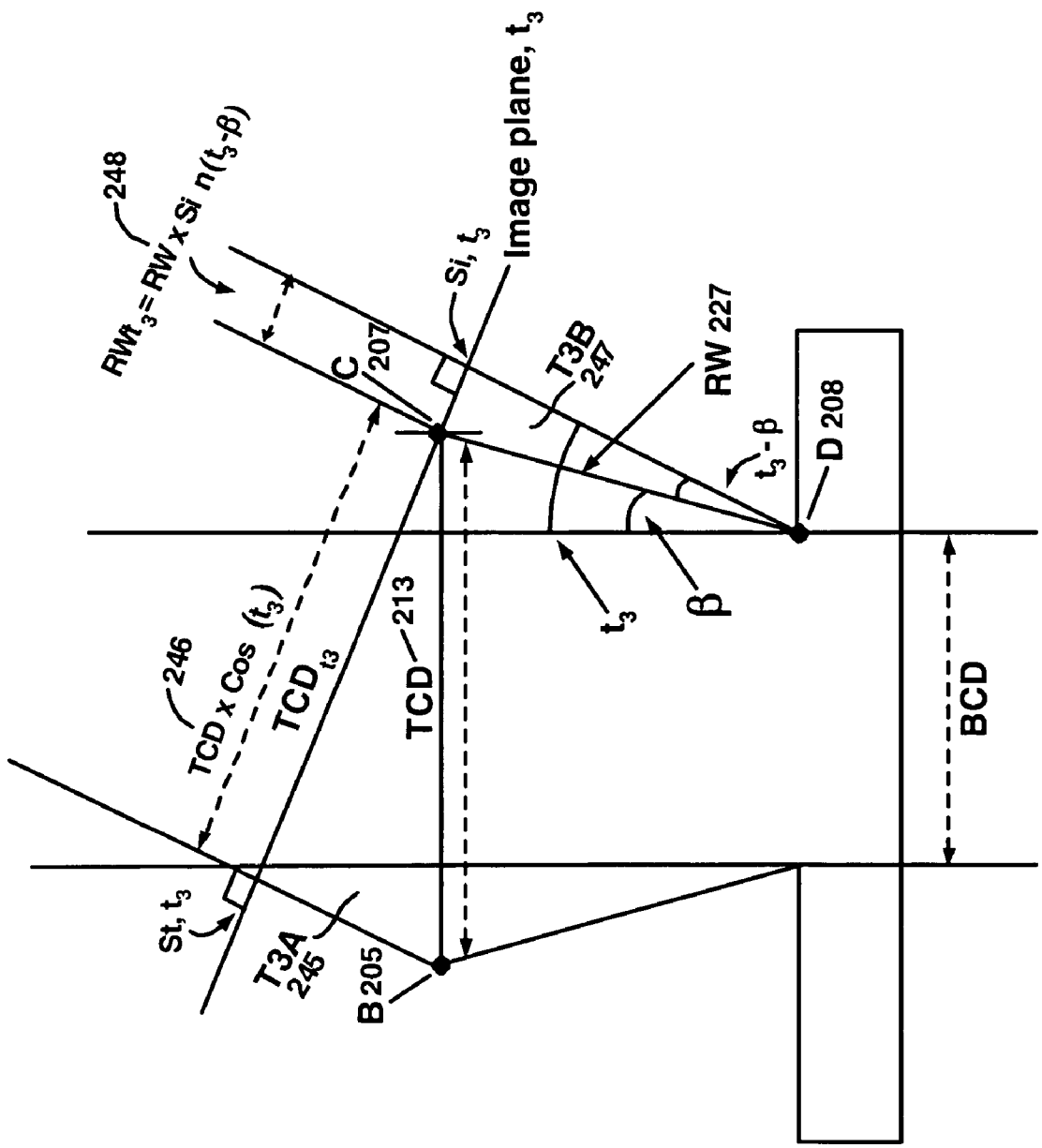
FIG. 2D illustrates an imaging process that is employed to determine dimensions of a structure that has a re-entrant profile according to one embodiment of the invention.
Figure 2E:
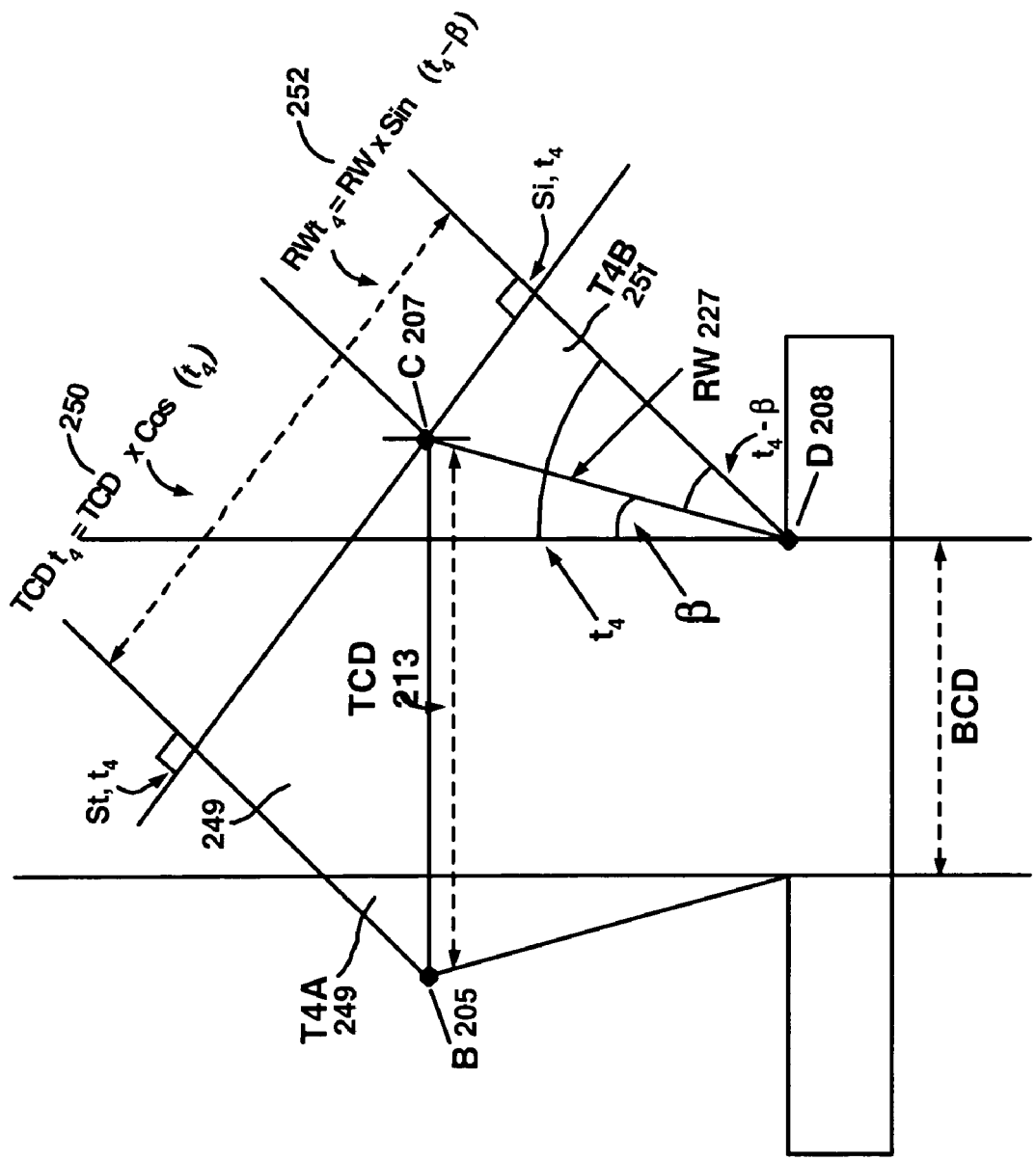
FIG. 2E illustrates an imaging process that is employed to determine dimensions of a structure that has a re-entrant profile according to one embodiment of the invention.

In one embodiment, another four equations can be obtained by imaging the opposite side of structure 201 using two right tilt angles t3 and t4. FIG. 2D and FIG. 2E illustrate how these equations can be generated.

FIG. 2D illustrates the imaging of a second side of structure 201 from a first perspective (e.g., at imaging angle t3). In the FIG. 2D embodiment, scanning is initiated at a point right of Si, t3 in the image plane that is coincident with a normal line that is perpendicular to the image plane and that intersects reference edge D 208. In this embodiment, scanning is terminated at a point left of St, t3 in the image plane that is coincident with a normal line that is perpendicular to the image plane and that intersects reference edge B 205.

FIG. 2D shows, in addition to the illustrations shown in FIGS. 2A-2C, right triangles T3A 245 and T3B 247 and right triangle dimensions TCDt3 246 and RWt3 248. It should be appreciated that TCDt3 246 and RWt3 248 are the projections of TCD 213 and RW 227 respectively into the image plane of the imaging system at right tilt angle t3. Using this projected image data that is acquired through the aforementioned imaging operations, a pair of right triangles T3A 245 and T3B 247 can be imputed with respect to surfaces TCD 213 and RW 227 of structure 201 as is illustrated in FIG. 2D. Moreover, in one embodiment, from the image data that is obtained by imaging structure 201 from first right tilt angle t3 the following first pair of equations can be derived:

$$TCDt3=TCD\times Cos(t3) \quad (8)$$

$$RWt3=RW\times Sin(t3-\beta) \quad (9)$$

FIG. 2E illustrates the imaging of a second side of structure 201 from a second perspective (e.g., at imaging right angle t4). In the FIG. 2E embodiment, scanning is initiated at a point right of Si, t4 in the image plane that is coincident with a normal line that is perpendicular to the image plane and that intersects reference edge D 208. In this embodiment, scanning is terminated at a point left of St, t4 in the image plane that is coincident with a normal line that is perpendicular to the image plane and that intersects reference edge B 205.

FIG. 2E shows, in addition to the illustrations shown in FIGS. 2A-2D, right triangles T4A 249 and T4B 251 and right triangle side dimensions TCDt4 250 and RWt4 252. It should be appreciated that TCDt4 250 and RWt4 252 are the projections of TCD 213 and RW 227 respectively into the image plane of the imaging system (not shown) at angle t4. Using this projected image data that is acquired through the aforementioned imaging operations, a pair of right triangles T4A 249 and T4B 251 can be imputed with respect to surfaces TCD 213 and RW 227 of structure 201 as is illustrated in FIG. 2E. In one embodiment, from the image data that is obtained by imaging what is shown in FIG. 2E as the right side of structure 201 from second right tilt angle t4 the following second pair of equations can be derived:

$$TCDt4=TCD\times Cos(t4) \quad (10)$$

$$RWt4=RW\times Sin(t4-\beta) \quad (11)$$

From tilt angle t4 equations (10) and (11) can be generated. Equation (11) has the same two unknown variables RW and $\beta$ as does equation (9). Thus, using equations (9) and (11), the unknowns RW and $\beta$ can be determined in a straightforward manner through substitution. Consequently, the final two of the four unknowns of equation (3), namely RW and $\beta$, needed to compute the BCD 219 using equation (3) can be determined through the imaging of a second side of structure 201. Moreover, after all of the unknowns have been computed using the processes that are described with reference to FIGS. 2A-2D, the BCD 219 can be readily computed using equation (3).

Operation

In operation, referring to FIGS. 2A-2E, a top down imaging of surface TCD 213 is initially performed. Subsequently, surfaces TCD and LW 225 of structure 201 are together imaged from two perspectives (e.g., left tilt angles t1 and t2). In one embodiment, from each angle t1 and t2 a pair of right triangles T1A 237 and T1B 239 and T2A 241 and T2B 243 respectively is imputed with respect to structure surfaces TCD 213 and LW 225. The solution of equations that are related to these triangles enables the determination of the length of side X of imputed right triangle T12 229 (see FIG. 2A). The length of side X of imputed right triangle T12 229 is given by the equation:

$$T12 \text{ side } X = LW \times \sin(\alpha) \quad (1)$$

Moreover, surfaces TCD 213 and RW 225 of structure 201 are similarly imaged from two right tilt angles t3 and t4. In one embodiment, from each angle t3 and t4 a pair of right triangles T2 and T2 is imputed with respect to structure surfaces TCD 213 and RW 227. The solution of equations that are related to these triangles enables the determination of the length of side X' of imputed right triangle T34 (see FIG. 2A). The length of side X' of imputed right triangle T34 is given by the equation:

$$T34 \text{ side } X' = RW \times \sin(\beta) \quad (2)$$

As discussed above, from the quantities computed using equations (1) and (2), the length of the BCD 219 can be determined from the following equation:

$$BCD = TCD - LW \times \sin(\alpha) - RW \times \sin(\beta) \quad (3)$$

Additionally, the re-entrant angle 233 at the left of structure 201 is given by: 90+α; and the re-entrant angle 235 at the right of structure 201 is given by: 90+β.

Consequently, a process for determining the BCD and the re-entrant angles of a structure (e.g., 201) that has a re-entrant profile that does not require reference features that are not presented by the structure itself is effected.

Figure 3:
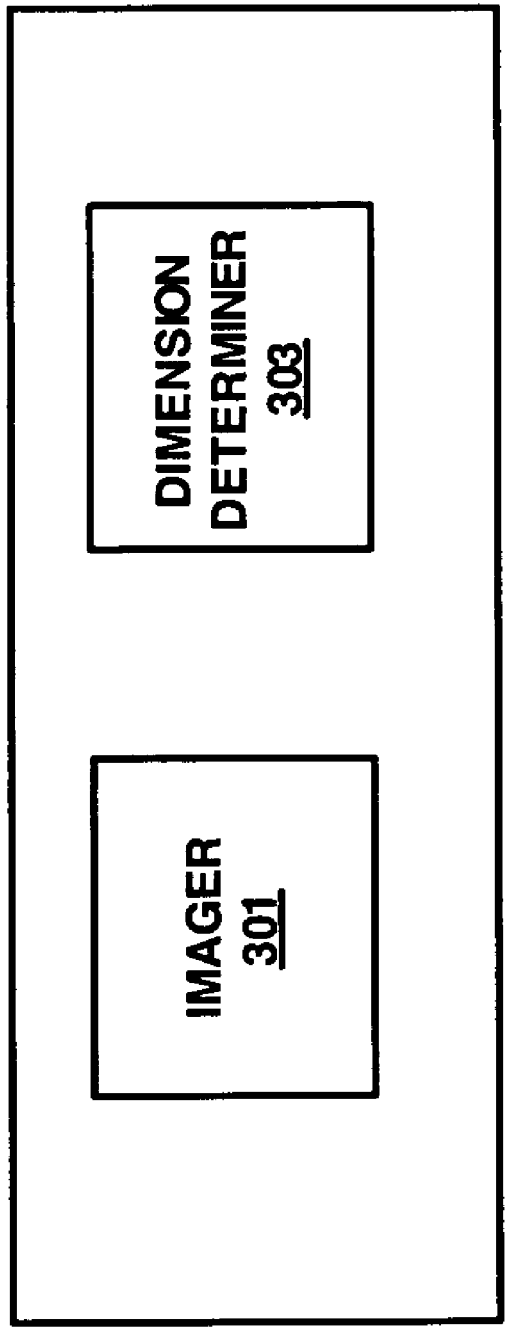
FIG. 3 shows an imaging system that can determine dimensions of a structure that has a re-entrant profile according to one embodiment of the invention.

FIG. 3 shows an imaging system 300 that can determine dimensions of a structure that has a re-entrant profile according to one embodiment of the invention. In the FIG. 3 embodiment, system 300 includes imager 301 and dimension determiner 303.

Imager 301 images structures that are located on a semiconductor or data storage wafer or other substrate. In one embodiment, the imager 301 can image structures from the top and from the side. In one embodiment, the imager 301 can acquire images from a plurality of imaging perspectives at either side of the structure (e.g., 201 in FIG. 2A-2E). In one embodiment the imager 301 can encompass components of a CD-SEM system. In alternate embodiments the imager 301 can encompass components of other type imaging systems that can be employed.

Dimension determiner 303 determines the dimension of a structure that is imaged. A bottom critical dimension of the structure can be determined from geometric information that is derived from the imaging operations performed by imager 301. It should be appreciated that in exemplary embodiments, because of the process that is employed, the bottom critical dimension of a structure can be determined without requiring a reference to features not presented by the structure itself. In the present embodiment, the dimension determiner 303 can be implemented in either hardware or software or both.

Figure 4:
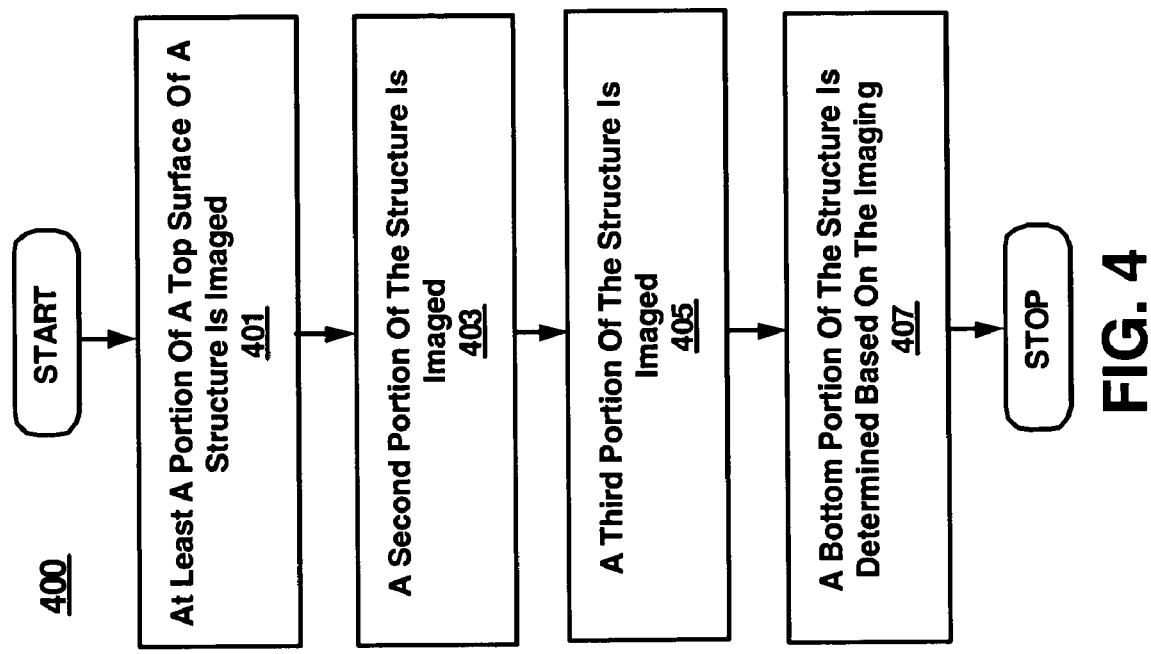
FIG. 4 is a flowchart of steps performed in accordance with one embodiment of the present invention.

Exemplary Operations in Accordance with Embodiments of the Present Invention FIG. 4 is a flowchart of steps performed in accordance with one embodiment of the present invention. The flowcharts illustrate processes of the present invention which, in one embodiment, are carried out by processors and electrical components under the control of computer readable and computer executable instructions. The computer readable and computer executable instructions may reside, for example, in data storage features such as computer usable volatile memory and/or computer usable non-volatile memory. However, the computer readable and computer executable instructions may reside in any type of computer readable medium. Although specific steps are disclosed in these flowcharts, such steps are exemplary. That is, the present invention is well suited to performing various other steps or variations of the steps recited in FIG. 4. Within the present embodiment, it should be appreciated that the steps of the flowchart may be performed by software, by hardware or by any combination of software and hardware.

FIG. 4 shows a flowchart 400 of the steps performed in a method for determining dimensions of a structure having a re-entrant profile according to one embodiment of the invention.

At step 401, at least a portion of the top surface the structure is imaged. In one embodiment, the first surface of the structure that is imaged is at least a portion of a top surface. In one embodiment, the dimension of the first surface of the structure that is imaged is a top critical dimension.

At step 403, a second portion of the structure is imaged from a plurality of imaging perspectives. In one embodiment, the plurality of imaging perspectives can be derived from a single location. In another embodiment, the plurality of imaging perspectives can be derived from a plurality of locations.

At step 405, a third portion of the structure is imaged from a plurality of imaging perspectives. In one embodiment, the plurality of imaging perspectives can be derived from a single location. In another embodiment, the plurality of imaging perspectives can be derived from a plurality of locations.

At step 407, the dimension of the bottom portion of the structure is determined based on the imaging performed in steps 401-405. In one embodiment, the dimension of the bottom portion of the structure that is determined is a bottom critical dimension. In one embodiment, the determination of a dimension of a bottom portion of the structure is based on image data that is generated from the imaging operations of steps 401-405. In one embodiment, the image data provides geometric information that is used to determine the dimension of the bottom portion of the structure.

Advantages of exemplary embodiments of the present invention include the capability of measuring re-entrant profiles without requiring external reference features or marks. More specifically, embodiments of the present invention do not require a creation or identification of external reference features from which to base its measurements of a structure's (e.g., 201 in FIG. 2) critical dimensions. In exemplary embodiments, the isolated lines of a structure that is being measured reference themselves with respect to edges located at the top and bottom surfaces of the structure.

Embodiments of the present invention can determine the bottom critical dimension of a structure by identifying three edges of the structure. It should be appreciated that these edges can be user assigned when there are multiple edges (e.g., multiple trapezoid or film stacks) that can be considered. In one embodiment, the move, acquire, measure (MAM) time can be less than 200 seconds. In one embodiment, MAM time can be 5 seconds for a top down CD measurement and about 60 to 90 seconds for tilt on each side.

Methods and systems for determining dimensions of a structure that has a re-entrant profile are disclosed. A method includes imaging at least a portion of a top surface of the structure. Subsequently, a second portion of the structure is imaged from a plurality of perspectives. A third portion of the structure is also imaged from a plurality of perspectives. A dimension of a bottom portion of the structure is determined based on the imaging.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for generating dimensions of a structure having a re-entrant profile, comprising:
    imaging at least a portion of a top surface of said structure to determine a top critical dimension, TCD, of said structure at a hardware imager of a hardware imaging system;
    imaging a second portion of said structure from a first plurality of imaging perspectives to generate a left sidewall dimension, LW, and an angle, $\alpha$, associated with a left re-entrant angle, $90°+\alpha$, of said structure at said hardware imager of said hardware imaging system;
    imaging a third portion of said structure from a second plurality of imaging perspectives to generate a right sidewall dimension, RW, and an angle, $\beta$, associated with a right re-entrant angle, $90°+\beta$, of said structure at said hardware imager of said hardware imaging system; and
    generating a bottom critical dimension, BCD, of said structure based on generating said top critical dimension, TCD, said left sidewall dimension, LW, said angle, $\alpha$, said right sidewall dimension, RW, and said angle, $\beta$ at a hardware dimension determiner of a hardware dimension determining system.

2. The method of claim 1 wherein said left sidewall dimension, LW, and said angle, $\alpha$, are generated from trigonometric relationships between said left sidewall dimension, LW, said angle, $\alpha$, and projections of said left sidewall dimension, LW, from said first plurality of imaging perspectives.

3. The method of claim 1 wherein said right sidewall dimension, RW, and said angle, $\beta$, are generated from trigonometric relationships between said right sidewall dimension, RW, said angle, $\beta$, and projections of said right sidewall dimension, RW, from said second plurality of imaging perspectives.

4. The method of claim 1 wherein said generating of said bottom critical dimension, BCD, of said structure does not require references external to said structure.

5. The method of claim 1 wherein said generating said bottom critical dimension, BCD, of said structure is based on an identification of three edges.

6. The method of claim 1 wherein said generating said bottom critical dimension, BCD, of said structure further comprises generating said bottom critical dimension, BCD, of said structure from an equation:

$$BCD=TCD-LW\times Sin(\alpha)-RW\times Sin(\beta).$$

7. The method of claim 1 wherein said first plurality of imaging perspectives comprises two different perspectives of a left sidewall of said structure; and
    wherein said second plurality of imaging perspectives comprises two different perspectives of a right sidewall of said structure.

8. The method of claim 1 wherein move-acquire-measure (MAM) time is estimated to be less than 200 seconds.

9. A computer readable storage medium comprising instructions thereon, when executed cause a computer system to perform, in an imaging system, a method for generating a bottom dimension of a structure having a re-entrant profile, comprising:
    generating image data related to a top dimension of said structure to determine a top critical dimension, TCD, of said structure;
    generating image data from a first plurality of imaging positions that are oriented in a first direction to determine a left sidewall dimension, LW, and an angle, $\alpha$, associated with a left re-entrant angle, $90°+\alpha$, of said structure;
    generating image data from a second plurality of imaging positions that are oriented in a second direction to determine a right sidewall dimension, RW, and an angle, $\beta$, associated with a right re-entrant angle, $90°+\beta$, of said structure; and
    generating a bottom critical dimension, BCD, of said structure based on determining said top critical dimension, TCD, said left sidewall dimension, LW, said angle, $\alpha$, said right sidewall dimension, RW, and said angle, $\beta$.

10. The method computer readable storage medium of claim 9 wherein said left sidewall dimension, LW, and said angle, $\alpha$, are generated from trigonometric relationships between said left sidewall dimension, LW, said angle, $\alpha$, and projections of said left sidewall dimension, LW, from said first plurality of imaging positions that are oriented in said first direction.

11. The method computer readable storage medium of claim 9 wherein said right sidewall dimension, RW, and said angle, $\beta$, are generated from trigonometric relationships between said right sidewall dimension, RW, said angle, $\beta$, and projections of said right sidewall dimension, RW, from said second plurality of imaging positions that are oriented in said second direction.

12. The computer readable storage medium of claim 9 wherein said generating said bottom critical dimension, BCD, of said structure does not require references external to said structure.

13. The computer readable storage medium of claim 9 wherein said generating said bottom critical dimension, BCD, of said structure is based on an identification of three edges.

14. The computer readable storage medium of claim 9 wherein said generating said bottom critical dimension, BCD, of said structure further comprises generating said bottom critical dimension, BCD, of said structure from an equation:

$$BCD=TCD-LW\times Sin(\alpha)-RW\times Sin(\beta).$$

15. The method computer readable storage medium of claim 9 wherein said first plurality of imaging positions that are oriented in said first direction comprises imaging positions from two different perspectives of a left sidewall of said structure; and
    wherein said second plurality of imaging positions that are oriented in said second direction comprises imaging positions from two different perspectives of a right sidewall of said structure.

16. The computer readable storage medium of claim 9 wherein MAM time is estimated to be less than 200 seconds.

17. A method for generating dimensions of a structure having a re-entrant profile, comprising:
    generating a top critical dimension, TCD, of said structure at a hardware dimension determiner of a hardware dimension determining system;

generating a left sidewall dimension, LW, and an angle, α, associated with a left re-entrant angle, 90°+α, of said structure at said hardware dimension determiner of said hardware dimension determining system;

generating a right sidewall dimension, RW, and an angle, β, associated with a right re-entrant angle, 90°+β, of said structure at said hardware dimension determiner of said hardware dimension determining system; and generating a bottom critical dimension, BCD, of said structure based on generating said top critical dimension, TCD, said left sidewall dimension, LW, said angle, α, said right sidewall dimension, RW, and said angle, β at said hardware dimension determiner of said hardware dimension determining system.

18. The method of claim 17 said left sidewall dimension, LW, and said angle, α, are generated from trigonometric relationships between said left sidewall dimension, LW, said angle, α, and projections of said left sidewall dimension, LW, from a first plurality of imaging perspectives.

19. The method of claim 17 wherein said right sidewall dimension, RW, and said angle, β, are generated from trigonometric relationships between said right sidewall dimension, RW, said angle, β, and projections of said right sidewall dimension, RW, from a second plurality of imaging perspectives.

20. The method of claim 17 wherein said generating said bottom critical dimension, BCD, of said structure does not require references external to said structure.

21. The method of claim 17 wherein said generating said bottom critical dimension, BCD, of said structure is based on an identification of three edges.

22. The method of claim 17 wherein said generating said bottom critical dimension, BCD, of said structure further comprises generating said bottom critical dimension, BCD, of said structure from an equation:

$$BCD=TCD-LW\times Sin(\alpha)+RW\times Sin(\beta).$$

23. The method of claim 17 wherein two different perspectives of a left sidewall of said structure provide projections of said left sidewall dimension, LW; and wherein two different perspectives of a right sidewall of said structure provide projections of said left sidewall dimension, LW.

24. The method of claim 17 wherein MAM time is estimated to be less than 200 seconds.

25. A system for determining dimensions of a structure having a re-entrant profile, comprising:

an imager that images at least a portion of a top surface of said structure to determine a top critical dimension, TCD, of said structure, at least a second portion of said structure from a first plurality of imaging perspectives to determine a left sidewall dimension, LW, and an angle, α, associated with a left re-entrant angle, 90°+α, of said structure and at least a third portion of said structure from a second plurality of imaging perspectives to determine a right sidewall dimension, RW, and an angle, β, associated with a right re-entrant angle, 90°+β, of said structure; and a determiner that determines a bottom critical dimension, BCD, of said structure based on determining said top critical dimension, TCD, said left sidewall dimension, LW, said angle, α, said right sidewall dimension, RW, and said angle, β.

26. The system of claim 25 wherein said determiner determines said left sidewall dimension, LW, and said angle, α, from trigonometric relationships between said left sidewall dimension, LW, said angle, α, and projections of said left sidewall dimension, LW, from said first plurality of imaging perspectives.

27. The system of claim 25 wherein said determiner determines said right sidewall dimension, RW, and said angle, β, from trigonometric relationships between said right sidewall dimension, RW, said angle, β, and projections of said right sidewall dimension, RW, from said second plurality of imaging perspectives.

28. The system of claim 25 wherein said determiner determines said bottom critical dimension, BCD, of said structure in a manner that does not require references external to said structure.

29. The system of claim 25 wherein said determiner determines bottom critical dimension, BCD, of said structure based on an identification of three structure edges.

30. The system of claim 25 wherein said determining said bottom critical dimension, BCD, of said structure further comprises determining said bottom critical dimension, BCD, of said structure from an equation:

$$BCD=TCD-LW\times Sin(\alpha)-RW\times Sin(\beta).$$

31. The system of claim 25 wherein said first plurality of imaging perspectives comprises two different perspectives of a left sidewall of said structure; and wherein said second plurality of imaging perspectives comprises two different perspectives of a right sidewall of said structure.

32. The system of claim 25 wherein MAM time is estimated to be less than 200 seconds.

* * * * *